(12) United States Patent
Harkins (10) Patent No.: US 9,515,824 B2
(45) Date of Patent: Dec. 6, 2016

(54) PROVISIONING DEVICES FOR SECURE WIRELESS LOCAL AREA NETWORKS

(71) Applicant: Aruba Networks, Inc., Sunnyvale, CA (US)

(72) Inventor: Daniel N Harkins, La Selva Beach, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 153 days.

(21) Appl. No.: 14/068,552

(22) Filed: Oct. 31, 2013

(65) Prior Publication Data

US 2015/0113277 A1 Apr. 23, 2015

Related U.S. Application Data

(60) Provisional application No. 61/893,440, filed on Oct. 21, 2013.

(51) Int. Cl.
*H04L 9/32* (2006.01)
*H04L 9/08* (2006.01)
*H04W 12/04* (2009.01)

(52) U.S. Cl.
CPC ............ *H04L 9/083* (2013.01); *H04L 9/0825* (2013.01); *H04L 9/0841* (2013.01); *H04W 12/04* (2013.01)

(58) Field of Classification Search
CPC . H04L 63/10; H04L 12/1886; H04L 63/107; H04L 63/20; G06F 21/10; G06F 21/606; G06Q 10/06
See application file for complete search history.

(56) References Cited

U.S. PATENT DOCUMENTS

| | | | |
|---|---|---|---|
| 5,901,229 A * | 5/1999 | Fujisaki et al. ................. 380/30 |
| 7,869,593 B2 * | 1/2011 | Beeson ........................... 380/30 |
| 8,254,579 B1 * | 8/2012 | Morgan .................. H04L 9/083 | 380/277 |
| 2005/0069137 A1 * | 3/2005 | Landrock ............. G06Q 20/341 | 380/278 |
| 2005/0149732 A1 * | 7/2005 | Freeman ................. H04L 29/06 | 713/171 |
| 2006/0212703 A1 * | 9/2006 | Kojima ............. G06Q 20/3674 | 713/175 |
| 2007/0055867 A1 * | 3/2007 | Kanungo et al. ............. 713/156 |
| 2007/0214357 A1 * | 9/2007 | Baldus et al. ................ 713/157 |
| 2008/0010452 A1 * | 1/2008 | Holtzman et al. ............ 713/158 |
| 2008/0240433 A1 * | 10/2008 | Fahn ..................... H04L 9/3273 | 380/255 |
| 2009/0106551 A1 * | 4/2009 | Boren et al. .................. 713/158 |
| 2009/0185677 A1 * | 7/2009 | Bugbee .......................... 380/28 |
| 2010/0070760 A1 * | 3/2010 | Vanderveen ........ H04L 63/0823 | 713/156 |
| 2011/0078438 A1 * | 3/2011 | Tie et al. ....................... 713/155 |
| 2011/0185037 A1 * | 7/2011 | Tiedemann ............. G06F 21/64 | 709/217 |
| 2011/0307698 A1 * | 12/2011 | Vanstone .............. H04L 9/0825 | 713/171 |

\* cited by examiner

*Primary Examiner* — Techane Gergiso
(74) *Attorney, Agent, or Firm* — Brooks, Cameron & Huebsch, PLLC (57) ABSTRACT

Before establishing a connection between a first and a second devices, the first device determines whether a third device is a trusted or untrusted device. If it is a trusted device, the first device receives from the third device a public key and information indicating the public key of the second device; and, uses the public key by combining its own private key and the public key of the second device to generate a shared secret, and using the shared secret to communicate to the second device. Otherwise, the first device refrains from communications with the third device. Also, the second device combines its private key with the public key of the first device received from the trusted third device to generate the same shared secret, and uses the shared secret to provision the first device to access a secured wireless network provided by the second device.

18 Claims, 5 Drawing Sheets

PROVISIONING DEVICES FOR SECURE WIRELESS LOCAL AREA NETWORKS

PRIORITY CLAIMS

Related Applications

This application claims benefits under 35 U.S.C. §119(e) to prior provisional application U.S. Patent Application No. 61/893,440, entitled "Provisioning Devices for Secure Wireless Local Area Networks," by Daniel N. Harkins, filed on Oct. 21, 2013. This application is related to patent application Ser. No. 13/783,001, entitled "Secure Configuration of a Headless Networking Device," by Daniel N. Harkins, filed on Mar. 1, 2013. The entire contents of the aforementioned applications are incorporated herein by reference.

FIELD

The present disclosure relates to provisioning of devices in wireless local area networks. In particular, the present disclosure relates to using a trusted third party and signature-less public key cryptography to provision devices for secure wireless local area networks.

BACKGROUND

Wireless devices must be properly provisioned to allow the devices to join a wireless network in compliance with IEEE 802.11 standards. Specifically, the joining process involves discovery, association, and authentication.

Conventionally, the provisioning process involves cumbersome manual provisioning of each device with information to discover and associate to a particular network, and with credentials to allow each device to authenticate to the network. Other networking protocols, such as Wi-Fi Simple Config, have attempted to simplify the provisioning process by having a dedicated configurator that provisions each device with the information to select the correct network and a shared secret that the device uses with a shared key confirmation protocol, e.g., the "Four-Way Handshake" as defined in the IEEE 802.11 standard.

The secret is shared by all devices in such network protocols, which voids some benefits of authentication, for example, data integrity protection, data source authentication, confidentiality, etc. Specifically, a secret shared by all devices may inadvertently allow a client device to impersonate other client devices to connect to an access point, or impersonate an access point to obtain information from other client devices using the shared secret.

Moreover, when devices need to communicate securely over a network, these devices must authenticate each other to ensure that they are, in fact, participating in the communications. One type of authentication protocol involves the use of a third party device trusted by both the devices involved in the secure communications. The trusted third party device is responsible for authenticating the devices and certifying a key which is used to authenticate the devices to each other. However, these authentication protocols involving trusted third party typically require extra infrastructure to be set up (for example, a Public Key Infrastructure or PKI), and thus are problematic for provisioning a device for secured communications in WLAN.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to network security, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

The present disclosure relates to provisioning of devices in wireless local area networks. In particular, the present disclosure relates to using a trusted third party and signature-less public key cryptography to provision devices for secure wireless local area networks.

During preliminary setup process, an access point providing secure wireless network generates a public/private key pair from a particular finite cyclic group suitable for use in a Diffie-Hellman key exchange. The public key is made available for disclosure, and the private key is stored to prevent disclosure.

A special device, called a configurator, will provision all devices to access a secure wireless network. The configurator must be manually set-up with the information necessary to provision a set of devices. This includes the Service Set Identifier (SSID), the specific authentication and key management suite (AKM) and cipher suite to use for association, the specific finite cyclic group used by the access point to generate its public/private key pair, and the access point's public key.

During provisioning process, each device to be provisioned into the secure wireless network will first be authenticated by the configurator. The specific technique of authentication may include a method disclosed in pending U.S. patent application Ser. No. 13/783,001, entitled "Secure Configuration of a Headless Networking Device," by Daniel N. Harkins, filed on Mar. 1, 2013.

After authentication, the configurator instructs the device to be configured about the specific finite cyclic group and the device to be configured generates its own public/private key pair in this group. The device to be configured provides the configurator with its public key and the configurator provides the access point's public key to the device to be configured. The configurator then provides all additional information necessary for the device to discover and associate to the secure wireless network. The device to be configured binds the access point's public key to the additional information it received. The device can have multiple such bindings, but it knows that when it discovers a particular network that one particular public key will be used to access it.

The configurator then connects to the access point and provides the access point with the public key and identifying information (e.g., a MAC address, or an authenticated identity established with the out of band authentication technique) for each device it provisioned. The access point binds the public key and associated identifying information for each device.

In this way, the configurator acts as a trusted third party to facilitate the trust of public keys. Unlike traditional trusted third parties (e.g. Certification Authorities, or CAs) the public keys it attests to are not used for digital signatures or for key encipherment and there are no certificates generated.

Since each device has the public key of the access point, a unique and pairwise shared secret, which is known only by the device and the access point, can be fixed by using each device's own private key and the access point's public key and performing a static-static Diffie-Hellman key exchange.

Similarly, for each provisioned device, the access point can use its private key and the public key of each device to fix the same unique and pairwise shared secret for that device. This fixed secret is then used as the symmetric credential for the "Four-Way Handshake" from the IEEE 802.11 standard.

In this manner, every pairwise tuple of provisioned device and Access Point will derive a unique shared secret. This secret will only be known by the Access Point and the corresponding provisioned device. Additionally, note that the secret can be derived before there has been any communication between the provisioned device and the Access Point.

For enhanced security, the configurator can help the access point to "revoke" the public key of a device that is no longer able to access the secure wireless network. The Configurator can also perform subsequent, additional, and simplified provisioning to "re-key" a public key. Note that, if the access point's public key is "re-keyed" it will require an additional re-provisioning of all devices.

According to embodiments of present disclosure, prior to establishing a connection between a first device and a second device, the first device determines whether a third device different than the second device is a trusted device or an untrusted device. If the first device determines that the third device is a trusted device, the first device receives from the third device, (a) a public key, and (b) information indicating that the public key corresponds to the second device. Moreover, the first device uses the public key to establish communications with the second device. If the first device determines that the third device is an untrusted device, the first device refrains from further communications with the third device.

In some embodiments, the first device determines authenticity of the public key based on determining that the public key is received from the trusted third device, for example, by verifying that the public key of the second device has been received through an authenticated channel between the first device and the third device. In other embodiments, the first device determines that the public key is to be used based on determining that the public key is received from the trusted third device without verifying any signature certifying the public key. Furthermore, note that, the public key is a part of an asymmetric key pair that further comprises a private key known only by the second device.

Certain details are set forth below in order to provide a thorough understanding of various embodiments of the disclosure, albeit the invention may be practiced through many embodiments other that those illustrated. For instance, illustrative embodiments describe provisioning a device. Such discussions are for illustrative purposes and do not preclude this invention from being conducted on other types of devices and using different encryption and key exchange systems. Also, well-known logic and operations may not be set forth in detail in order to avoid unnecessarily obscuring this description.

Networking Environment

Figure 1:
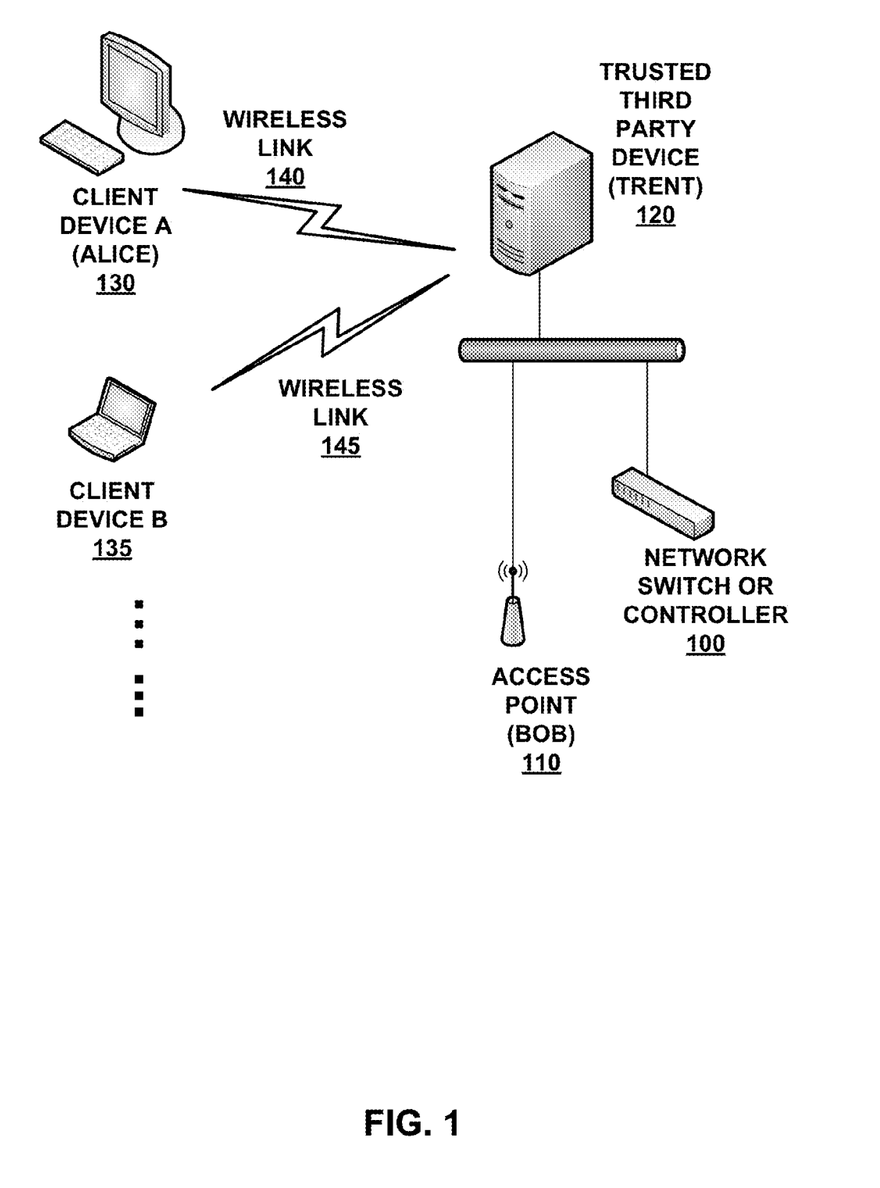
FIG. 1 illustrates an exemplary networking environment according to embodiments of the present disclosure.

FIG. 1 illustrates an exemplary networking environment according to embodiments of the present disclosure. In accordance with one embodiment of the disclosure, networking environment illustrated in FIG. 1 includes network switch or controller device 100, access point 110, trusted third party device 120, and a number of client devices, such as client device A 130, client device B 134, etc. One or more of these devices are coupled together via one or more of interconnects. For example, both access point 110 and trusted third party device 120 connected via wired interconnects to network switch or controller 110. Moreover, client device A 130 and client device B 135 attempt to be connected to access point 110.

However, client device A 130 has a pre-existing trust relationship with trusted third party device 120 and is connected to trusted third party device 120 via wireless link 140. Also, trusted third party device 120 has a pre-existing trust relationship with access point 110. Thus, trusted third party device 120 is a mutually trusted party between client device A 130 and access point 110.

Likewise, client device B 135 also has a pre-existing trust relationship with trusted third party device 120 and is connected to trusted third party device 120 via wireless link 145. Thus, trusted third party device 120 is a mutually trusted party between client device B 135 and access point 110.

In some embodiments, the mutually trusted third party between client device B 135 and access point 110 may be a device different from the mutually trusted third party device 120 between client device A 130 and access point 110.

In some embodiments, the pre-existing trust relationship may be a transient relationship that is valid only for a limited period of time prior to a client device (e.g., client device A 130 or client device B 135) connects to access point 110, "Alice" represents a first party, namely a digital device (and/or its user) such as client device A 130, which is identified to other network devices and/or client devices by an identifier. Examples of an identifier, represented for Alice as "A", may include, but is not limited or restricted to a Media Access Control (MAC) address, a binary string, an alphanumeric value being a series of alphanumeric characters (e.g., numbers 0-9, lower and upper case text A-Z and a-z, or a combination thereof), a non-English characters or names, one or more graphic images, or the like. Herein, according to this embodiment in the disclosure, the first digital device may be adapted to operate as a client device (e.g., a mobile telephone such as a smart phone, portable computer or tablet, etc.) by a first user.

"Bob" represents a second party, namely a second digital device (and/or its user) such as access point 110, which is identified to other network devices and/or users by an identifier. The identifier for Bob is represented herein as "B". According to this embodiment in the disclosure, the second network device may be adapted to provide access or service to a network. Examples of the second network device may include, but are not limited or restricted to a server, an access point, a controller, a router, or even firewall software operating within one of these devices.

"Trent" represents a third party, namely a third network device (and/or its user) such as trusted third party device 120, which is identified to other network devices and/or users by an identifier. The identifier for Trent is represented herein as "T". Herein, according to this embodiment in the disclosure, the third network device may be adapted to operate as a device that is trusted by the first and second network devices for authenticating communications by such devices.

Prior Ephemeral Diffie-Hellman based authentication protocol typically operates when there has already been an established communication session between a first network device represented by Alice and a second network device represented by Bob. Both Alice and Bob authenticate each other and take part in generating the ephemeral key used by both Alice and Bob to encrypt the communication session between Alice and Bob.

Embodiments of the present disclosure allow Alice and Bob to derive a shared secret that is unbeknownst to any other party, including a mutually trusted third party, prior to any communication exchanges occur between Alice and Bob. This would enhance the security of the communications between Alice and Bob, including but are not limited to, the communications needed for provisioning Alice by Bob, the handshake communications for establishing an initial session between Alice and Bob, etc.

Provisioning Device for Secure Communications

Figure 2:
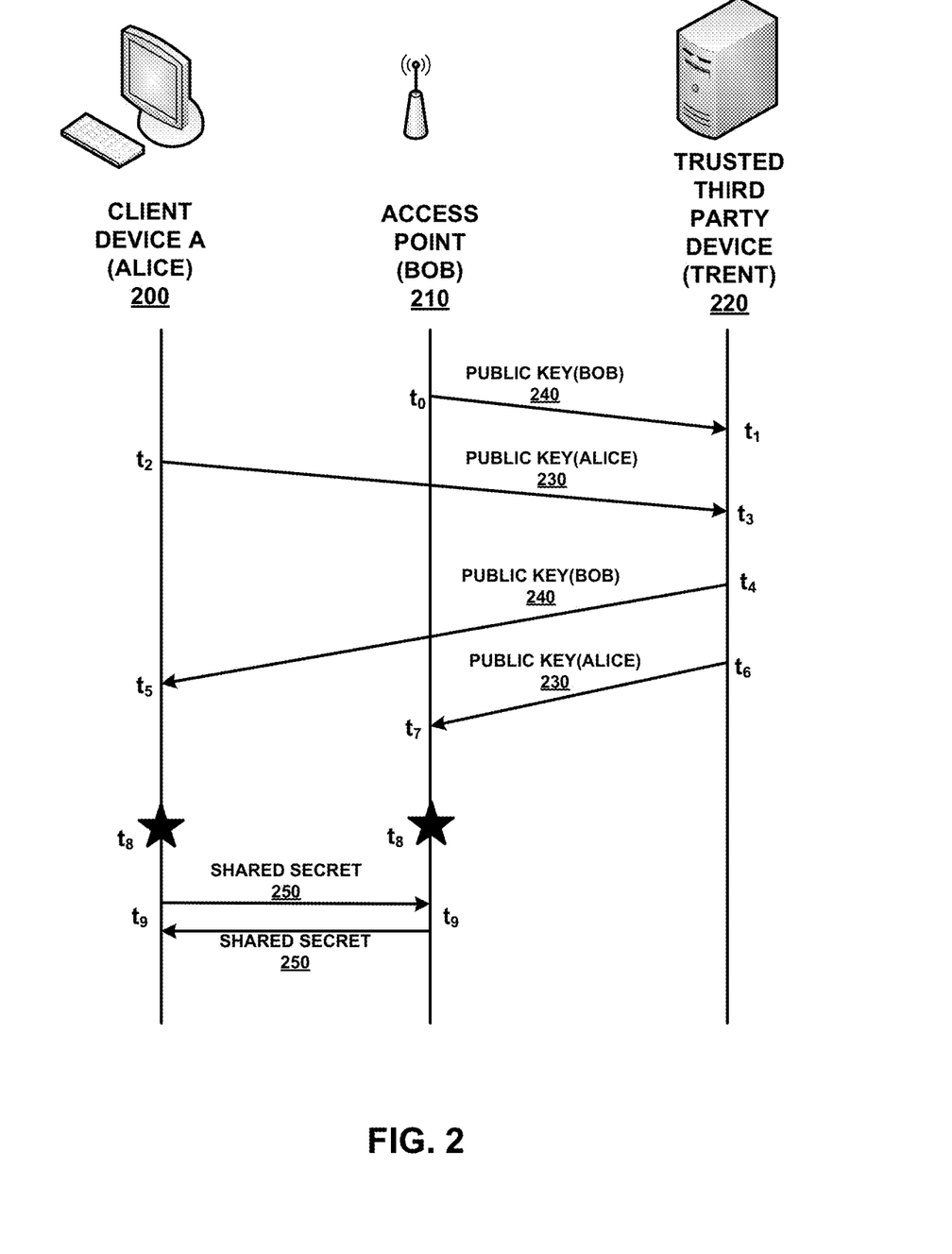
FIG. 2 illustrates an exemplary sequence of communication exchanges among devices according to embodiments of the present disclosure.

FIG. 2 illustrates exemplary communication exchanges among Alice, Bob, and Trent. FIG. 2 includes at least a client device A 200 represented as Alice, an access point 210 represented as Bob, and a trusted third party device 220 represented as Trent. In this example, it is assumed that client device A 200 needs to be provisioned and has not established a connection to the network advertised by access point 210. With the technology movements to Bring Your Own Device (BYOD), it becomes increasingly important to provision client devices, such as client device A 200 in a WLAN with appropriate level of access to various enterprise WLAN resources. Embodiments of the present disclosure would allow for provisioning a client device for WLAN access without the need for any certificate enrollment with any certificate authority.

Also, it is assumed that client device A 200 has a way to connect to trusted third party device 220, for example, via an Ethernet or wireless interface. Similarly, access point 210 and trusted third party device 220 also have established ways to communication with each other via one or more interconnects, e.g., Ethernet, cables, wireless links, etc.

Furthermore, it is assumed that both client device A 200 and access point 210 have established a trust relationship with trusted third party device 220 prior to the illustrated communication exchanges take place. In some embodiments, trusted third party device 220 may be a part of the wireless local area network that access point 210 belongs to. In other embodiments, trusted third party device 220 may be connected to client device A 200 and/or access point 210 through a public network and a firewall.

In some embodiments, trusted third party device 220 may be a certificate authority (CA). A CA generally refers to an authority in a network that issues and manages security credentials and public keys for message encryption. As part of a public key infrastructure (PKI), a CA checks with a registration authority (RA) to verify information provided by the requestor of a digital certificate. If the RA verifies the requestor's information, the CA can then issue a certificate. In other embodiments, trusted third party device 220 can merely be an intermediary device that is trusted by a party during a transient or limited period of time.

Moreover, each of client device A 200 (Alice) and access point 210 (Bob) possesses at least a private key and a public key pair.

In the example illustrated in FIG. 2, because there is a pre-existing trust relationship between access point 210 (Bob) and trusted third party device 220 (Trent), at time point $t_0$, access point 210 (Bob) transmits its public key, e.g., public key (Bob) 240 to trusted third party device 220 (Trent). Trusted third party device 220 (Trent) receives public key (Bob) 240 at time point $t_1$.

Similarly, because there is a pre-existing trust relationship between client device A 200 (Alice) and trusted third party device 220 (Trent), at time point $t_2$, client device A 200 (Alice) transmits its public key, e.g., public key (Alice) 230 to trusted third party device 220 (Trent). Trusted third party device 220 (Trent) receives public key (Alice) 230 at time point $t_3$.

Subsequently, trusted third party device 220 (Trent) transmits a copy of public key (Bob) 240 to client device A 200 (Alice) at time point $t_4$. Public key (Bob) 240 is received by client device A 200 (Alice) at time point $t_5$. Moreover, trusted third party device 220 (Trent) transmits a copy of public key (Alice) 230 to access point 210 (Bob) at time point $t_6$. Public key (Alice) 230 is received by access point 210 (Bob) at time point $t_7$.

At approximately time point $t_8$, client device A 200 (Alice) and access point 210 (Bob) independently derive shared secret 250. In particular, client device A 200 (Alice) derives shared secret 250 based on public key (Bob) 240 received at time point $t_5$ and a private key of Alice, which is paired to public key (Alice) 230 that client device A 200 (Alice) sent to trusted third party device 220 (Trent). Further, access point 210 (Bob) derives shared secret 250 based on public key (Alice) 230 received at time point $t_7$ and a private key of Bob, which is paired to public key (Bob) 240 that access point 210 (Bob) sent to trusted third party device 220 (Trent).

Finally, at approximately time point $t_9$, client device A 200 (Alice) and access point 210 (Bob) can use their independently derived shared secret 250 to communicate with each other. In some embodiments, these communications between client device A 200 (Alice) and access point 210 (Bob) involve provisioning of client device A 200 (Alice) to access the WLAN provided by access point 210 (Bob), establishing an association between client device A 200 (Alice) and access point 210 (Bob) in the WLAN, establishing a secured communication tunnel between client device A 200 (Alice) and another device in the WLAN, etc.

Note that, in some embodiments, there may be more than one client devices that need to be provisioned for the network. Each client device will complete the same public key exchange process with access point through their mutually trusted third party device, which may be the same or different from trusted third party device 220 (Trent). For example, client device Alan (A2) (not shown) may transmit its public key (A2) to trusted third party device 220 (Trent) and receive public key (Bob) 240 from trusted third party device 220 (Trent). Trusted third party device 220 (Trent) then transmits public key of client device A2 (Alan) to access point 210 (Bob). Then, client device Alan can derive its shared secret with access point 210 (Bob) based on client device A2's private key (A2) and public key (Bob). Likewise, access point 210 (Bob) can derive shared secret for client device Alan based on private key (Bob) and public key (A2).

Therefore, access point 210 (Bob) will be using different shared secrets while communicating with client device A 200 (Alice) and client device A2 (Alan, not shown). This is because that the shared secret for communicating with client device A 200 (Alice) used by access point 210 (Bob) is based on the combination of public key (Alice) 230 and private key (Bob). On the other hand, the shared secret for communicating with client device Alan (not shown) used by access point 210 (Bob) is based on the combination of public key (A2) and private key (Bob). Because the shared secrets used by the access point are different rather than shared, it is computationally impossible for a client device to impersonate other client devices or the access point. Hence, embodiments of the present disclosure provide enhanced security over conventional authentication protocols used for provisioning wireless client devices for secure WLAN access.

Figure 3A:
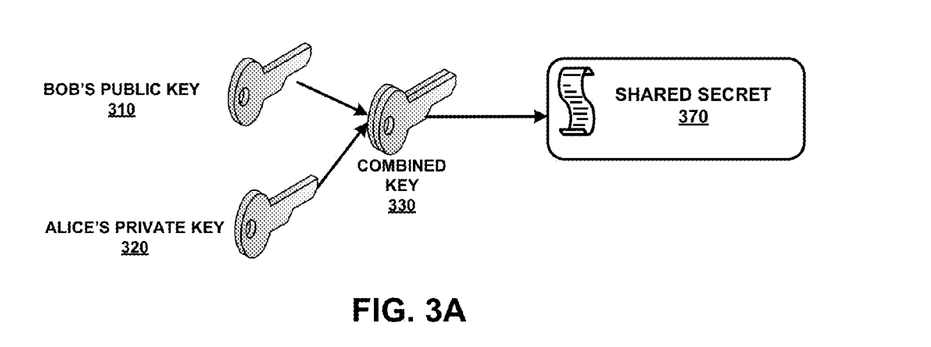
FIGS. 3A-3B are diagrams illustrating exemplary derivation of shared secret by various devices according to embodiments of the present disclosure.
Figure 3B:
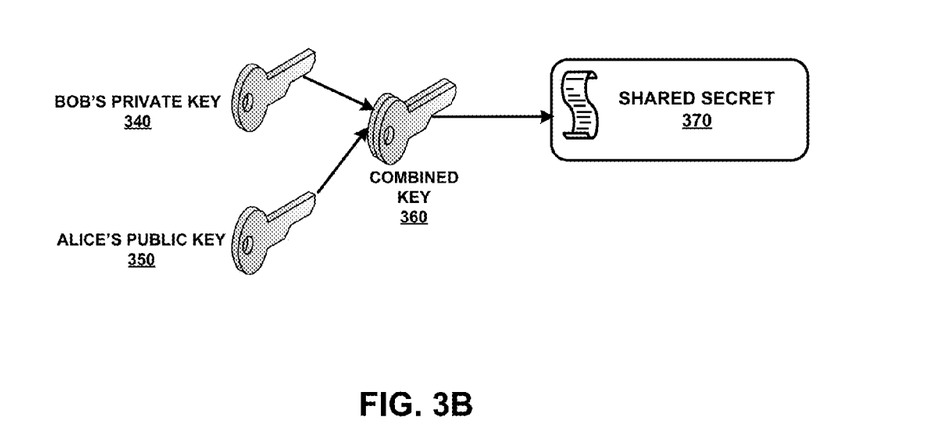

FIGS. 3A and 3B illustrate exemplary derivation of shared secret by various devices according to embodiments of the present disclosure. In particular, FIG. 3A illustrates how Alice derives a shared secret for communication with Bob. FIG. 3B illustrates how Bob derives the same shared secret for communication with Alice.

Here, each of Alice and Bob generates a random number, e.g., Alice's private key 320 R(a) by Alice and Bob's private key 340 R(b) by Bob. Next, Alice computes the value of Alice's public key 350 $S(a)=(g^{R(a)})$ mod p. Likewise, Bob computes the value of Bob's public key $S(b)=(g^{R(b)})$ mod p. Then, Alice and Bob exchange the values of Alice's public key 350 S(a) and Bob's public key 310 S(b), for example, via a mutually trusted third party during a particular time period.

Note that, the third party device only needs to be mutually trusted by both Alice and Bob during the particular time period prior to their initial communication (e.g., provisioning communications, etc.). The trust relationships may terminate or expire upon completion of the communication exchanges as illustrated in FIG. 2 without affecting direct communications between Alice and Bob.

Then, Alice calculates combined key 330 $(S(b)^{R(a)})$ mod p, and uses combined key 330 to derive shared secret 370. Bob similarly calculates combined key 330 $(S(a)^{R(b)})$ mod p, and uses combined key 360 to derive shared secret 370.

Given that $s(a)=(g^{R(a)})$ mod p, $$(S(a)^{R(b)}) \bmod p = (g^{(R(a)*R(b))}) \bmod p.$$

Given that $S(b)=(g^{R(b)})$ mod p, $$(S(b)^{R(a)}) \bmod p = (g^{(R(b)*R(a))}) \bmod p.$$

Because $(g^{(R(a)*R(b))}) \bmod p = (g^{(R(b)*R(a))}) \bmod p$, $$(S(a)^{R(b)}) \bmod p = (S(b)^{R(a)}) \bmod p.$$

Therefore, combined key 330 and combined key 360 derive the same shared secret 370 even though they are independently and differently computed.

Processes for Provisioning Devices for Secure Wireless Local Area Networks

Figure 4:
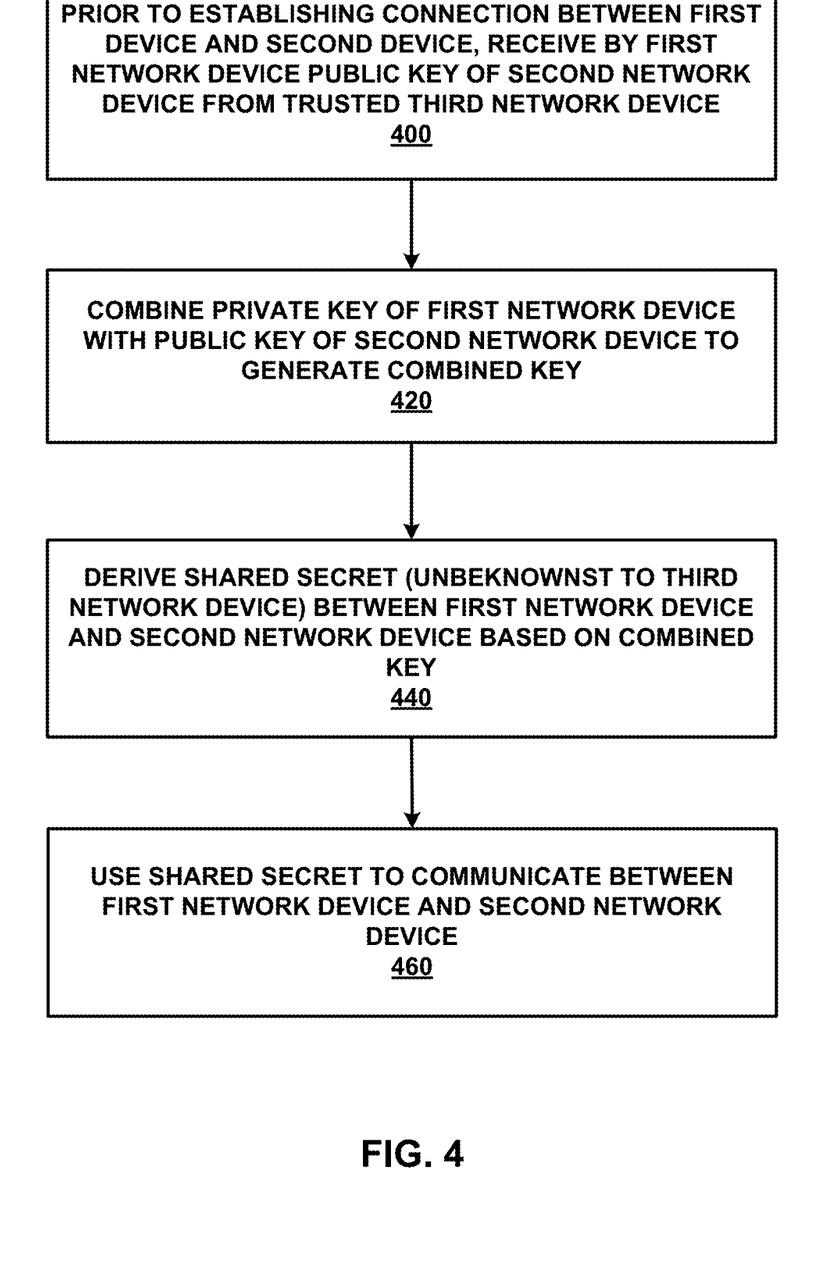
FIG. 4 is a flowchart illustrating an exemplary process for provisioning devices for secure WLAN according to embodiments of the present disclosure.

FIG. 4 is a flowchart illustrating an exemplary process for provisioning devices for secure WLAN according to embodiments of the present disclosure. As illustrated in FIG. 4, during operations and prior to establishing a connection between a first device (e.g., client device Alice) and a second device (e.g., access point Bob), the disclosed system receive by the first network device a public key of the second network device from a mutually trusted third network device (e.g., trusted third party device Trent) (operation 400).

Next, the disclosed system combines a private key of the first network device (e.g., Alice) with the received public key of the second network device (e.g., Bob) to generate a combined key (operation 420).

Furthermore, the disclosed system derives a shared secret unbeknownst to the third network device (e.g., Trent) between the first network device (e.g., Alice) and the second network device (e.g., Bob) based on the combined key (operation 440).

Finally, the disclosed system uses the shared secret to communication between the first network device (e.g., Alice) and the second network device (e.g., Bob) (operation 460), for example, for provisioning the first network device (e.g., Alice) to access a WLAN provided by the second network device (e.g., Bob).

System for Provisioning Devices for Secure Wireless Local Area Networks

Figure 5:
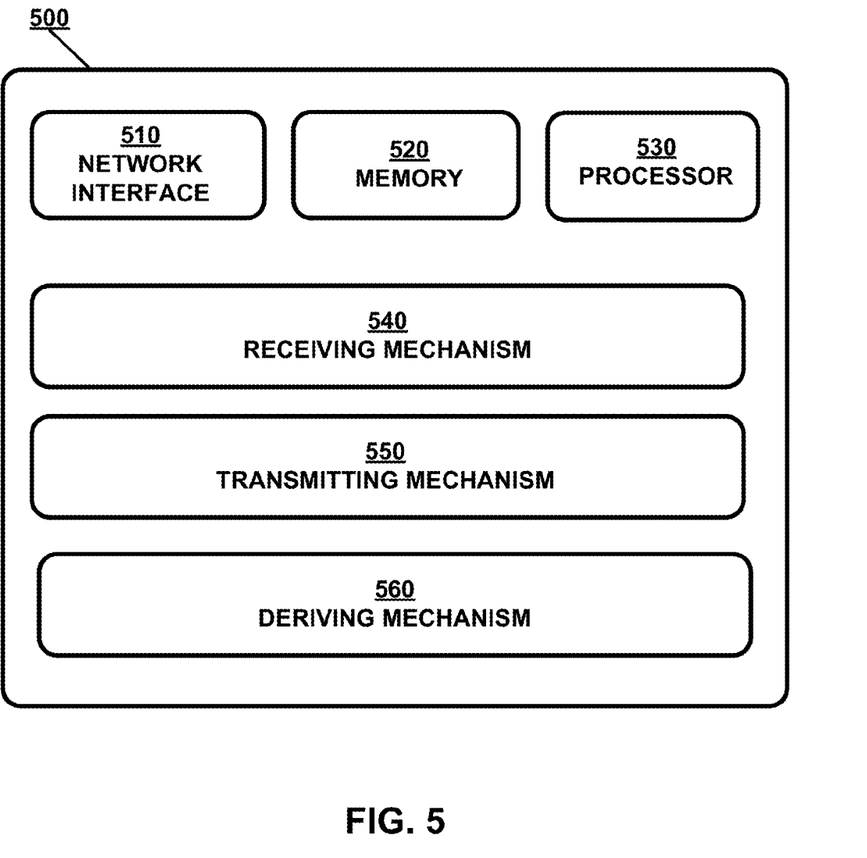
FIG. 5 is a block diagram illustrating an exemplary system for provisioning devices for secure WLAN according to embodiments of the present disclosure.

FIG. 5 is a block diagram illustrating a network device system for policy-based control mechanism for wireless network physical layer resources. Network device 500 includes at least a network interface 510 capable of communicating to a wired network, a memory 520 capable of storing data, a processor 530 capable of processing network data packets, and a number of mechanisms coupled to the processor 530. The mechanisms include, but are not limited to, a receiving mechanism 540, a transmitting mechanism 550, a deriving mechanism 560, etc. Note that, network device 500 may be used as a network switch, network router, network controller, network server, etc. Furthermore, network device 500 may serve as a node in a distributed or a cloud computing environment.

Network interface 510 can be any communication interface, which includes but is not limited to, a modem, token ring interface, Ethernet interface, wireless IEEE 802.11 interface (e.g., IEEE 802.11n, IEEE 802.11ac, IEEE 802.11ad, etc.), cellular wireless interface, satellite transmission interface, or any other interface for coupling network devices. In some embodiments, network interface 510 may be software-defined and programmable, for example, via an Application Programming Interface (API), and thus allowing for remote control of the network device 500.

Memory 520 can include storage components, such as, Dynamic Random Access Memory (DRAM), Static Random Access Memory (SRAM), etc. In some embodiments, memory 520 includes public keys received from a trusted third party device that correspond to other devices in the wireless network. In some embodiments, memory 520 includes derived shared secrets used for secure communications with other devices in the wireless network.

Processor 530 typically includes a networking processor that is capable of processing network data traffic. In some embodiments, processor 530 may include multiple processing cores and/or ASICs.

Receiving mechanism 540 generally receives messages from other devices in a wireless networks. Specifically, receiving mechanism 540 can receive a public key of a second device from a third device prior to establishing a connection between a first device and a second device. Note that, a trust relationship shall pre-exist between the first device and the second device.

Transmitting mechanism 550 generally transmits messages to other devices in the wireless network. In particular, transmitting mechanism 550 may use a shared secret for communications between the first device and the second device. More specifically, the communications may involve provisioning a client device to access a secure wireless network provided by the access point prior to the client device associates with the access point without any trust relationship established between the client device and the access point prior to any direct communications between the client device and the access point, because both the client device and the access point mutually trust a third device during a particular transient period of time.

Deriving mechanism 560 generally derives a key or secret for secured communications with other devices in the network. For example, deriving mechanism 560 can combine a private key of a first device with the public key of the second device to generate a shared secret by the first device. Note that, the private key of the first device is known only to the first device. Furthermore, the shared secret is used to communicate between the first device and the second device.

In some embodiments, deriving mechanism 560 derives a public/private key pair compatible with Diffie-Hellman protocol from a finite cyclic group. The public/private key pair is selected from a group based on, for example, Finite Field Cryptography, and/or Elliptic Curve Cryptography, etc.

In some embodiments, deriving mechanism 560 may combine the private key of the first device with the public key of the second device to generate a combined key; and, derive the shared secret between the first device and the second device based on the combined key.

In some embodiments, the shared secret is unbeknownst to the third device from which the first device receives the public key of the second device.

In some embodiments, the second device receives a public key of the first device from the third device, wherein a second trust relationship exists between the second device and the second device. Further, the second device combines a private key of the second device with the public key of the first device to generate the shared secret. Note that, the private key of the second device is known only to the second device. In addition, the shared secret is not known to the third device because the third device knows neither the private key of the first device nor the private key of the second device.

In some embodiments, the first device comprises a client device; the second device comprises an access point; and, no trust relationship exists between the first device and the second device. In some embodiments, he first device trusts that the received public key of the second device is an authentic public key of the second device in response to the public key of the second device being received through an authenticated channel between the first device and the third device.

It is important to note that, although the present disclosure focuses on provisioning client devices to communicate with, e.g., access points for access to secured wireless network, the protocol disclosed herein works for peer-to-peer connections in similar manner. In a peer-to-peer network without a WLAN infrastructure, a mutually trusted third party can introduce two devices to communicate with each other without an access point. The two devices do not have a pre-existing trust relationship with each other and have never previously communicated with each other.

According to embodiments of the present disclosure, network services provided by network device 500, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Examples of digital devices also include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller. Examples of digital devices also include a sensor, an appliance, a security device, such as a gate, door or window lock, or a physical plant controller such as for a water heater, steam generator, pumping system, or climate control system.

One type of digital device, referred to as a "controller," is a combination of hardware, software, and/or firmware that is configured to process and/or forward information between digital devices within a network.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Herein, the terms "logic" (or "logic unit") and process" are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

The term "message" is a grouping of data such as a packet, a frame, a stream (e.g., a sequence of packets or frames), an Asynchronous Transfer Mode (ATM) cell, or any other series of bits having a prescribed format. Herein, a message comprises a control payload and a data payload. The control payload is adapted to include control information such as source and destination MAC (Media Access Control) addresses, Internet Protocol (IP) addresses (e.g., IPv4 or IPv6 addressing), protocol, source and destination port information, and/or packet type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer-readable storage medium storing embedded instructions that when executed by a processor of a first device cause the processor to:
    prior to establishing a connection between the first device and a second device, determine whether a third device different than the second device is a trusted device or an untrusted device;
    responsive to determining that the third device is the trusted device:
        receive, by the first device from the third device:
            a public key of the second device; and
            information indicating that the public key corresponds to the second device;
        authenticate the public key of the second device based on the public key being received through an authenticated channel between the first device and the third device;
        establish, by the first device, communications with the second device using the authenticated public key of the second device without verifying a signature certifying the public key; and responsive to determining that the third device is the untrusted device, refraining from communications with the third device.

2. The non-transitory computer-readable storage medium of claim 1, wherein the instructions further cause the processor of the first device to determine authenticity of the public key of the second device based on determining that the public key is received from the trusted third device.

3. The non-transitory computer-readable storage medium of claim 2, wherein the first device trusts that the received public key of the second device is an authentic public key of the second device in response to the public key of the second device being received through the authenticated channel between the first device and the third device.

4. The non-transitory computer-readable storage medium of claim 1, wherein the public key of the second device is a part of an asymmetric key pair that further comprises a private key known only by the second device.

5. The non-transitory computer-readable storage medium of claim 1, wherein to use the public key of the second device to establish communications with the second device, the instructions are to cause the processor of the first device to:

combine a private key of the first device with the public key of the second device to generate a shared secret by the first device, wherein the private key of the first device is known only to the first device; and use the shared secret to communicate between the first device and the second device, wherein the shared secret is not known by the third device.

6. The non-transitory computer-readable storage medium of claim 5, wherein the second device is to:

receive a public key of the first device from the third device, wherein a second trust relationship exists between the second device and the third device; and combine a private key of the second device with the public key of the first device to generate the shared secret by the second device, wherein the private key of the second device is known only to the second device.

7. The non-transitory computer-readable storage medium of claim 1, wherein the first device comprises a client device, wherein the second device comprises an access point, and wherein no trust relationship exists between the first device and the second device.

8. The non-transitory computer-readable storage medium of claim 1, the instructions further cause the processor of the first device to:

derive a public/private key pair compatible with Diffie-Hellman protocol from a finite cyclic group, wherein the public/private key pair is selected from a group based on one of Finite Field Cryptography and Elliptic Curve Cryptography.

9. A first device comprising:
a processor;
a memory; and
a network interface to receive one or more data packets, wherein the memory stores instructions that when executed by the processor cause the processor to:
prior to establishment of communications between the first device and a second device, determine whether a third device different than the second device is a trusted device or an untrusted device;
refrain from communications with the third device in response to a determination that the third device is the untrusted device; and in response to a determination that the third device is the trusted device:
receive, from the third device, a public key of the second device;
authenticate the public key of the second device based on the public key being received through an authenticated channel between the first device and the third device; and
establish communications with the second device using the authenticated public key of the second device without verifying a signature certifying the received public key.

10. The first device of claim 9, wherein the first device determines authenticity of the public key based on determining that the public key is received from the trusted third device.

11. The first device of claim 10, wherein the first device trusts that the received public key is an authentic public key of the second device in response to the public key of the second device being received through the authenticated channel between the first device and the third device.

12. The first device of claim 9, wherein the public key is a part of an asymmetric key pair that further comprises a private key known only by the second device.

13. The first device of claim 9, wherein the instructions further cause the processor to:

combine a private key of the first device with the public key of the second device to generate a shared secret by the first device, wherein the private key of the first device is known only to the first device; and use the shared secret to communicate between the first device and the second device, wherein the shared secret is not known by the third device.

14. The first device of claim 13, wherein the second device receives a public key of the first device from the third device, wherein a second trust relationship exists between the second device and the third device;

wherein the second device combines a private key of the second device with the public key of the first device to generate the shared secret, wherein the private key of the second device is known only to the second device.

15. The first device of claim 9, wherein the first device comprises a client device, wherein the second device comprises an access point, and wherein no trust relationship exists between the first device and the second device.

16. The first device of claim 9, wherein the instructions further cause the processor to derive a public/private key pair compatible with Diffie-Hellman protocol from a finite cyclic group, wherein the public/private key pair is selected from a group based on one of Finite Field Cryptography and Elliptic Curve Cryptography.

17. A method for a first device to establish a connection with a second device, the method comprising:

prior to establishing a connection between the first device and the second device, determining, by the first device, whether a third device different than the second device is a trusted device or an untrusted device;

responsive to determining that the third device is a trusted device:
receiving, by the first device from the third device, a public key of the second device;
authenticating, by the first device, the public key of the second device based on the public key being received through an authenticated channel between the first device and the third device;

establishing, by the first device, communications with the second device using the authenticated public key of the second device without verifying a signature certifying the public key; and responsive to determining that the third device is an untrusted device, refraining, by the first device, from communications with the third device.

18. The method of claim 17, wherein using the public key of the second device to establish communications with the second device comprises:

combining a private key of the first device with the public key of the second device to generate a shared secret by the first device, wherein the private key of the first device is known only to the first device; and using the shared secret to communicate between the first device and the second device, wherein the shared secret is not known by the third device.

* * * * *